United States Patent Office 3,540,192
Patented Nov. 17, 1970

3,540,192
APPARATUS FOR THE DE-AERATION OF SOLUTIONS, PREFERENTIALLY SOLUTIONS OF VISCOSE
Olof Birger Nyström, Sundsbruk, Sundsvall, and Bengt Henrik Strid, Valberg, Sweden, assignors to Sunds Aktiebolag, Sundsbruk, Sundsvall, Sweden
Filed Aug. 5, 1968, Ser. No. 750,156
Claims priority, application Sweden, Aug. 15, 1967, 11,467/67
Int. Cl. B01d *19/00*
U.S. Cl. 55—192      3 Claims

ABSTRACT OF THE DISCLOSURE

The capacity of a tank for de-aerating viscous solutions, such as viscose, is increased by providing substantially vertical plates in the tank, the solution to be de-aerated being fed to the top of the plates to flow downwardly thereover. The plates may be provided with stepped platforms to retard flow of the solution.

---

Figure 1:
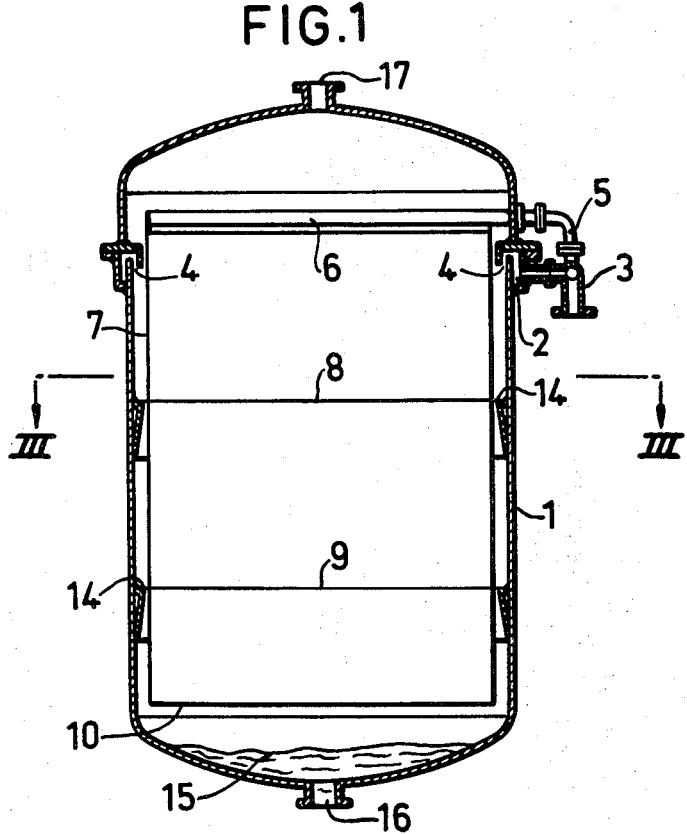

It is a generally known fact that the air occurring in a solution of viscose must be separated from the solution before the latter is introduced into a coagulating bath, for if air-bubbles are present in a solution of viscose upon entering the coagulating bath the fibers are broken and, respectively, holes are formed in the foil being extruded through nozzles into the coagulation bath, in which the solution coagulates. Consequently, de-aeration of the solution must take place prior to the same being introduced into the coagulating bath.

Previously there are known a plurality of types of apparatus for the de-aeration of solutions of viscose. Such apparatus chiefly comprise a tank which is under a pressure lower than the atmospheric pressure. Into a tank of the kind just mentioned the solution of viscose is pumped through slot-shaped openings for the purpose of facilitating the separation of the air from the solution of viscose. These known de-aerating apparatus are, however, impaired by several drawbacks, the most conspicuous of which are:

(a) The volumes of the de-aerating apparatus are large in relation to their capacities.

(b) The tank has the shape of an upside down cone, in which case the viscose, in the shape of a film, is caused to flow down the inside of the cone shell. Because of the conicity the thickness of the film is increasing downwards towards the level surface and the de-aeration of the viscose is rendered more difficult.

(c) The solution of viscose is pumped in on the upper sides of conical, annular plate members provided in the tank. On the under sides of said plate members there gradually form films of coagulated viscose owing to the fact that finely distributed particles of viscose, having accompanied the current of air led away from the tank, during their passage through the tank deposit themselves on those surfaces that do not serve as de-aerating surfaces for the solution. The films may then loosen and fall down into the solution, which will thereby become unsuitable for being pumped through nozzles.

(d) Complicated disassembling for the cleaning of the slot-shaped openings.

(e) The time of stay of the solution of viscose within the tank during the phase of de-aeration becomes too short owing to the fact that the film of viscose formed at the pumping-in operation is allowed to fall freely along the wall of the tank.

The present invention relates to an apparatus for the de-aeration of solutions, preferentially solutions of viscose, in which all of the aforementioned drawbacks have been eliminated. The de-aerating apparatus comprises, in a manner known per se, a preferentially upright tank, which is preferably also of substantially cylindrical shape, said tank, when in operation, being meant to be kept under a pressure lower than the atmospheric pressure and being provided with circumferentially positioned means for the introduction of the solution into the tank, in which the de-aeration is to take place by the solution being caused to flow downwards through the tank.

Figure 2:
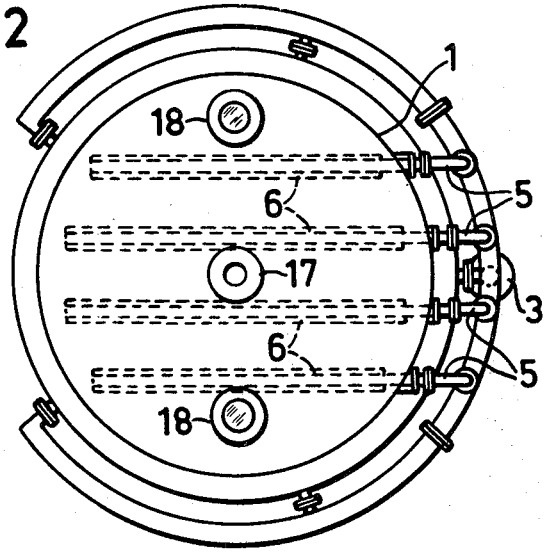
Figure 3:
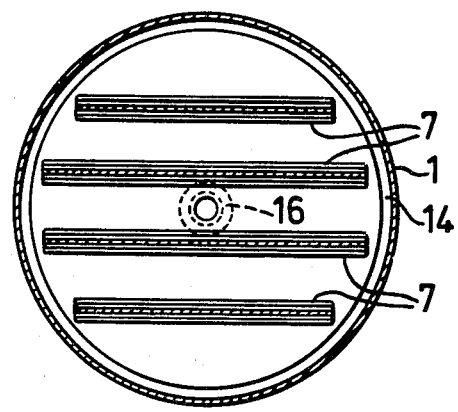
Figure 4:
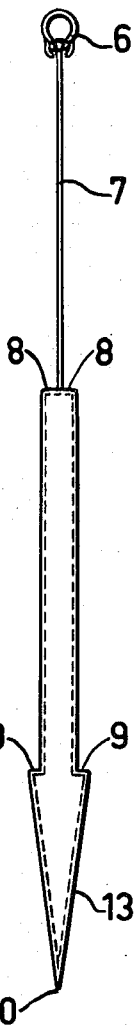
Figure 5:
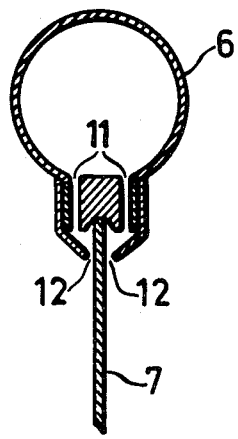

The substantial characteristic features of the invention consist therein that the inside of the tank preferably is provided with platforms serving for prolonging the time of stay of the solution within the tank and that in the interior, free space of the tank there are provided additional means for increasing the de-aerating capacity of the apparatus, said additional means comprising a number of, preferably tube-shaped, members extending from the periphery of the tank shell inwards across the major part of the cross sectional area of the tank, said members serving for the introduction of the solution into the tank, and moreover de-aerating members connected to said members of introduction and preferentially embodied as plate members arranged vertically, or substantially vertically, within the tank, each individual member of introduction and the de-aerating member connected thereto being arranged in such a manner relatively to each other that, on leaving the member of introduction, the solution is delivered simultaneously to both of the de-aerating surfaces of the de-aerating member These and other characteristic features of the invention will appear from the following detailed description of one embodiment of a device for the de-aeration of viscose, reference being had to the accompanying, diagrammatical drawing. In the drawing FIG. 1 shows a vertical sectional view of the device, FIG. 2 showing a plan view of the same. FIG. 3 shows a section on the line III—III of FIG. 1, FIG. 4 being an end view of a member for the introduction of solution of liquid together with the de-aerating member connected thereto. FIG. 5 finally, on a larger scale, shows a vertical sectional view of the uppermost part of FIG. 4.

Reference numeral 1 indicates the de-aerating tank proper, which is shown to be in the shape of a substantially cylindrical, upright container but which may be of any other suitable shape and which may also be inclining or horizontal. At the periphery of the tank there is provided one (or more) channel 2, through which solution of viscose is meant to be introduced from a supply conduit 3 by way of slot inlets 4 of a kind known per se and extending preferably all the way around the tank. Along the periphery of the tank there are provided further supply conduits 5, which extend into the tank and, within the latter, are embodied as tubes 6 slotted or perforated along their whole lengths or only along part thereof and which extend in the transverse direction of the tank and preferably across the major part of the cross sectional area of the tank. To each of the tubes 6 there is connected a de-aerating member 7 which, when seen in an end view, comprises a plate member (FIG. 4) the upper portion of which is plane and the lower portion of which is provided with platforms 8 and 9 and the bottom part of which tapers to a point 10. The widened portions of the de-aerating members preferably are embodied as boxes, as indicated in dashed lines, and preferably consist of welded sheet-metal. FIG. 5, in greater detail, shows how each tube 6 is connected to the upper portion of the de-aerating member 7. Said figure shows how at the place of transition from the supply tube 6 to the member 7, there is provided a double slot 11, through which the solution of viscose flowing in the tube 6 is, at 12, first thrown out onto both sides of the member 7 in order then to flow down to the bottom of the tank by way of the platforms 8 and 9—where the speed is slowed down and a desired prolongation of the time of stay within the tank is obtained—and the inwards inclining surface 13 tapering in to the point 10. The width of the slot 11 can be changed by applying spacers (not shown). That part of the solution of viscose which from the annular channel 2 and through the slot inlets 4 is extruded into the tank, will flow down the inside of the tank, which is, in a manner known per se, also provided with platforms 14 for slowing down the speed of the downwards flowing solution. The de-aerated solution of viscose 15 is led away (pumped out) through a discharge socket 16. Numeral 17 indicates a socket provided on the upper portion of the tank 1 and serving for obtaining connection with the conduit for the evacuation of the separated air and numerals 18 are inspection sockets, each one provided with a bull's eye.

By the provision of the additional de-aerating members (plates) 7 and by providing the injection tubes 6 with double slots, thereby doubling the slot length, and by simultaneously spraying, in this way, both surfaces of the de-aerating members a considerable increase of capacity of the apparatus is obtained. Normally the capacity is calculated to amount to about 25 kg. solution of viscose per minute per meter of slot.

What is claimed is:

1. In apparatus for the de-aeration of a viscous solution including a vertically disposed, substantially cylindrical tank, means for uniformly introducing the solution circumferentially to the top of the inside of the tank, means for maintaining said tank at sub-atmospheric pressure and platform means disposed circumferentially about the inside wall of the tank intermediate the top and bottom thereof for retarding flow of the solution downwardly over the wall thereof; the improvement comprising a plurality of substantially parallel vertically disposed plate-shaped members within said tank, each provided with at least one stepped platform intermediate the top and bottom thereof for retarding flow of the viscous solution and each having a slender cross sectional area, a plurality of substantially parallel tubes extending across the top of the tank, each of said tubes being provided with at least one slotted opening, each of said plate-shaped members being associated with and spaced from the sides of said at least one slotted opening whereby the solution introduced through said tubes passes through said slotted opening onto both sides of said plate-shaped members.

2. Apparatus as claimed in claim 1 wherein the at least one slotted opening is on the underside of each tube and wherein the top of each of said plate-shaped members extends into and is spaced from the sides of said at least one slotted opening.

3. Apparatus as claimed in claim 1 wherein each of said plate-shaped members is hollow at those areas provided with the at least one stepped platform.

References Cited

UNITED STATES PATENTS

| | | | |
|---|---|---|---|
| 2,355,057 | 8/1944 | Copeland | 55—190 |
| 2,684,728 | 7/1954 | Malm | 55—190 |
| 3,301,401 | 1/1967 | Hall | 261—112 X |
| 3,131,117 | 4/1964 | Hickey | 55—189 X |

FOREIGN PATENTS 23,078  8/1908  Great Britain.

REUBEN FRIEDMAN, Primary Examiner

R. W. BURKS, Assistant Examiner